Figure 2:
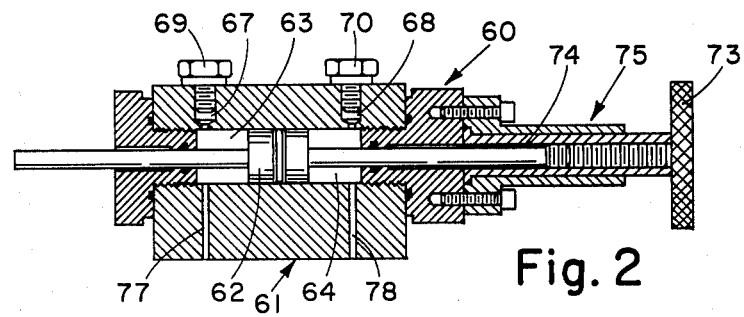

United States Patent [19]
Winget et al.

[11] 3,892,130
[45] July 1, 1975

[54] DEEP SEA MICROBIOLOGICAL SAMPLING AND CULTURING APPARATUS AND METHOD

[75] Inventors: Clifford L. Winget; Kenneth W. Doherty, both of Woods Hole; Carl O. Wirsen, Pocasset, all of Mass.

[73] Assignee: United States of America as represented by the Secretary of the Navy, Washington, D.C.

[22] Filed: Feb. 11, 1974

[21] Appl. No.: 441,729

[52] U.S. Cl. ............................................ 73/425.4 R
[51] Int. Cl.² .......................................... G01N 1/12
[58] Field of Search ............... 73/425.4, 155, 170 A; 166/264, 163

[56] References Cited
UNITED STATES PATENTS

| | | | |
|---|---|---|---|
| 1,591,511 | 7/1926 | Carins | 166/163 |
| 3,095,930 | 7/1963 | Kisling | 73/425.4 R |

*Primary Examiner*—S. Clement Swisher
*Attorney, Agent, or Firm*—R. S. Sciascia; C. E. Vautrain, Jr.

[57] ABSTRACT

A microbiological specimen sampler is presented which provides for the sterile recovery of microorganisms such as bacteria, fungi and yeast from ocean depths in undamaged form. The sampler comprises two substantially identical chambers axially aligned and separated by a port block. Each chamber contains a free floating piston, the pistons being initially disposed in the same respective position in the chambers. One chamber is virtually filled with a snubbing fluid between the port block and its floating piston while the other chamber is initially pressurized with a gas. At a preselected position and depth a valve is opened which admits seawater into the sampler forcing one floating piston to drive snubbing fluid through the port block against the other floating piston which compresses the gas in its chamber as sample fluid is admitted into the first chamber. The specimen sample is locked in the first chamber when flow ceases. The sample can be removed or other media can be injected into it by means of a transfer block which may now be secured to the valved end of the sampler.

5 Claims, 2 Drawing Figures

DEEP SEA MICROBIOLOGICAL SAMPLING AND CULTURING APPARATUS AND METHOD

This invention concerns microorganism retrieval and, more particularly, a means of and method for the sterile recovery of microorganisms such as bacteria, fungi and yeast from ocean depths in undamaged form, maintaining the in situ hydrostatic pressure of the sampling depth.

Bacteria and fungi living in deep seawater and sediments are responsible for the degradation of organic material and are thought to affect the corrosion as well as acoustic characteristics of these materials. The investigation of microbiological activity in the deep ocean, therefore, has come to be of considerable interest in recent years. Long term in situ investigation of the characteristics of these bacteria is possible only through recovering the bacteria in undamaged form and examining and otherwise studying the bacteria as they exist in their natural habitat, e.g. under their ambient conditions of pressure and temperature. The high pressure microbiological chamber described herein provides scientists for the first time with a method and means for retrieving microorganisms from great sea depths under ambient conditions of their habitat and, also, an opportunity to investigate their growth characteristics under controlled laboratory conditions of pressure and temperature.

The present invention concerns a microbiological specimen sampler which consists generally of two identical chambers each containing a free floating piston and separated by a port block. One chamber is substantially filled with a snubbing fluid between the port block and its floating piston while the other chamber is initially pressurized with a gas on the corresponding side of its floating piston. At a preselected position and depth, a valve is opened which admits seawater into the sampler above the floating piston in the snubbing fluid chamber. A continued exposure of this piston to the environment admits ambient water and its contents into this chamber, forcing the snubbing fluid through the port block and against the floating piston in the gas chamber. The gas, which was initially pressurized at a selected pressure determined by the working depth and temperature, is compressed and is compressible to such an extent that the snubbing fluid may be substantially entirely transferred to the gas chamber. The specimen sample is locked in the chamber which initially contained snubbing fluid when flow into the sampler ceases. It can be removed or other media can be injected into it by means of a transfer block which can be secured to the valved end of the sampler.

Accordingly, it is an object of the present invention to provide a microbiological specimen sampler which can recover microorganisms from great ocean depths in undamaged form and maintain the microorganisms under ambient conditions.

It is another object of this invention to provide a microbiological specimen chamber which is capable of retrieving deep water samples at a slow rate of flow and protecting the trapped bacteria under ambient conditions and without sudden pressure changes for laboratory analysis.

It is a further object of this invention to provide a microbiological specimen sampler which permits the sterile recovery of microorganisms such as bacteria, fungi and yeast from great ocean depths in undamaged form, allowing the specimen to be maintained at in situ pressures and temperatures and permitting the addition to or removal of portions of the specimen without changing the internal pressure within the chamber.

Figure 1:
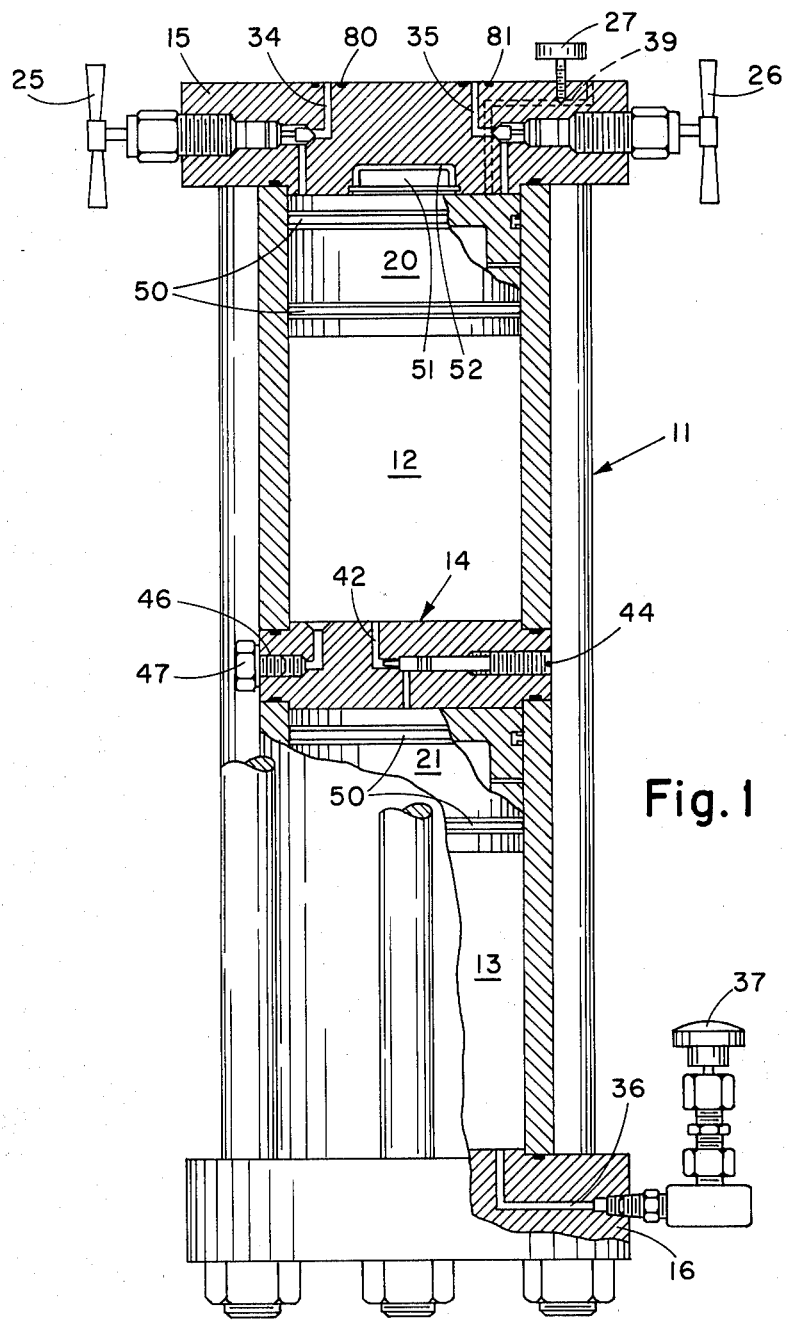

Other objects, advantages and novel features of the invention will become apparent from the following detailed description thereof when considered in conjunction with the accompanying drawings in which like numerals represent like parts throughout and wherein:

FIG. 1 is a sectional front elevation of the microbiological sampler partly in perspective; and FIG. 2 is a side elevation in section of the transfer block for connection to the top of the sampler.

In FIG. 1, a microbiological sampler 11 is shown mainly in section, the sampler comprising a pair of chambers 12 and 13 separated by a port block 14 and closed at the ends by end caps 15 and 16. Chambers 12 and 13 each contain a floating piston, 20 and 21, respectively, while end cap 15 is provided with remotely set control valves 25 and 26 and an in situ set control valve 27. Passages 34 and 35 in end cap 15 communicate with interior chamber 12 while passage 36 in end cap 16 communicates with chamber 13. A control and fill valve 37 is provided in end block 16 to permit precharge of chamber 13 with a gaseous medium. An additional passage 39 in end cap 15 communicates with chamber 12 under control of valve 27.

Port block 14 is provided with a passage 42 which communicates between chambers 12 and 13, an adjustable orifice valve 44 for controlling the opening in passage 42, and a fill port 46 and cap 47 for initially charging chamber 12 with fluid. Pistons 20 and 21 are provided with "O" ring seals 50 for isolating the operating faces of the pistons in their respective chambers. A means for permitting internal mixing in chamber 12 is provided in the form of a plastic encapsulated magnetic stirring rod 51 which is positioned in a small cavity 52 in end cap 15.

FIG. 2 illustates a microbiological retrieval chamber or transfer block 60 which is used in conjunction with sampler 11 and which includes a bore in ported block 61 in which a sliding piston 62 is received that divides the cylinder bore of the block into two chambers, 63 and 64. A pair of drilled passages 67 and 68 in block 61 are closed by plugs 69 and 70, respectively, to provide access to chambers 63 and 64. Linear travel of piston 62 is obtained by rotating a handle 73 which actuates a screw mechanism 74 that is an integral part of a piston assembly 75. A pair of drilled passages 77 and 78 in block 61 are made to register with passages 34 and 35 in end cap 15 when block 61 is attached to the outer face of that end cap.

The sampler is prepared for sampling by first removing fill plug 47, at fill port 46, from the side of port block 14. Valves 26 and 27 are closed, and valve 25 opened. An independent water source is connected to valve 25, and sufficient water pressure is applied to move piston 20 down the bore of chamber 12. The exact distance the piston moves is not critical, the objective of this operation being to provide a small cushion of fluid at the top face of piston 20. Valve 25 is now closed, and the water source removed. A high pressure air or nitrogen source is now attached to valve 37 at the base of chamber 13. Pressure is slowly applied so as to move piston 21 upward until it bottoms against the face of port block 14. Valve 37 is now closed, trapping the gas and piston in position against port block 14. Chamber 12 is now filled with snubbing fluid through fill passage 46, with the specimen chamber rocked during filling to remove all air that may be trapped between the bottom of piston 20 and port block 14. When chamber 12 is filled, sufficient fluid pressure is applied at fill port 46 to build up a low pressure within chamber 12. The specimen sampler is now positioned with port block 14 at the top. With the fluid pressure continuously applied to fill port 46, valve 25 is slowly cracked to remove any entrapped air and to assure the drilled passages are filled with fluid. Valve 25 is closed, and the operation repeated with valve 26. Valve 27 is now cracked and all remaining air and fluid is allowed to escape. The fluid pressure in chamber 12 will force piston 20 against port block 14. This step reduces dilution of the seawater specimen to a minimum, and removes all entrapped air. Valve 27 is now closed. With the sampler placed in a horizontal position, fluid pressure is removed from fill port 46. The chamber is rocked to remove remaining entrapped air in chamber 12. The chamber is stopped off with fluid, then fill plug 47 is replaced. A high presssure air or nitrogen source is now attached to valve 37 at the base of chamber 13. Valve 37 is opened and the final precharge pressure applied to chamber 13. The precharge pressure is determined by the depth to which the unit is to be lowered and actuated, and the temperature expected to be encountered at that depth. For instance, if the sampler is to be used to obtain a seawater specimen from 6,000 feet at an assumed bottom water temperature of 4°C the room temperature precharge of the gaseous medium is approximately 875 psig. Pressure curves may be prepared for use with the chamber piston at any assumed constant room temperature such as 75°F (24°C). The curves should include the reduction in precharged pressure which results from the temperature change that occurs as the chamber descends to 6,000 feet. The volume change that occurs due to this temperature variation will effect the final position of piston 21 in chamber 13. When properly precharged in accordance with the temperature and pressure anticipated to be encountered, piston 21 will not bottom against lower end cap 16 when the specimen sampler has obtained a full specimen, in this embodiment 0.9 liter. The air cushion or accumulator effect provided by the precharge assists in balancing any minor internal pressure changes due to possible weepage in the pure hydraulic side of the specimen sampler. After a period of 15 minutes to permit the pressure to stabilize, the pressure in chamber 13 is again topped off. Value 37 is now closed and the external charging equipment is removed. The microbiological retrieval sampler is now prepared for operation in obtaining a deep water specimen.

The embodiment of the microbiological sampler illustrated was adapted for use with a deep submersible vehicle. In operation, the vehicle operator opens valve 27 at a preselected depth, allowing seawater to enter through drilled passage 39 in upper end cap 15 and to apply pressure to the top face of piston 20 in chamber 12. The pressure acting against the top face of piston 20 starts moving the piston down the bore of chamber 12, forcing the snubbing fluid out of chamber 12 and into chamber 13 through the adjustable orifice in passage 42. The orifice restricts the flow of snubbing fluid as it moves into chamber 13 and as the flow continues, piston 21 moves down the bore of chamber 13. This motion of piston 13 gradually compresses the gaseous precharge on the opposite side of the piston. The snubbing or restricting action of the orifice in passage 42 maintains a slow rate of specimen flow into the upper portion of chamber 12, protecting the bacteria in the seawater from any sudden pressure changes or shock waves that would normally be encountered such as in opening an empty specimen flask at great ocean depths and pressures. When piston 21 compresses the precharge gas to a value equal to the external seawater pressure, the flow of soft specimen water ceases. Piston 21 does not bottom against end cap 16 but positions itself some distance from the end cap face depending upon the originally precharged pressure therein.

Adjustable orifice valve 44 may be preset to softsample at any desired rate. The range selected for this embodiment of the invention was a 15-minute filling time for a 0.9 liter sample. When specimen chamber 12 has filled and all flow into passage 39 has ceased, valve 27 is closed locking the specimen in the chamber. The device is at this time returned to the surface for laboratory investigation of the sample.

Transfer block 61 provides a means for removing portions of a captured specimen or injecting other media into the specimen without changing the pressure of the microbiological specimen. Movable piston 62 is in a pressure balanced assembly and when moved increases the volume of one chamber, e.f. 63, by the identical quantity that the opposite chamber, 64, is decreased. Drilled passages 77 and 78 are sealed by O rings, inserted in grooves 80 and 81 when the transfer block is secured to end cap 15 of the sampler, and mate with drilled passages 34 and 35 of the microbiological sampler. The piece part components used to fabricate the transfer blocks preferably are sterilized by the use of fluids, gaseous mediums, and/or conventional autoclave methods.

To obtain a specimen from or inject a fluid medium into the microbiological sampler, transfer block 61 is secured to the end cap 15 using appropriate size threaded fasteners, not shown. O ring elastomer gasket seals preferably are used to prevent leakage between the drilled passages of the two asssemblies. Fill port plugs 69 and 70 are removed from the transfer block and one cavity, e.g. 63, is filled with an inert sterile fluid in this instance. Drilled passages 77 and 34 are also filled with this fluid. Handle 73 is now rotated in a direction that will move linear piston 62 against the fluid, in this instance from right to left, forcing the excess fluid out of the top of port 67. The direction of travel of the piston is continued until the piston bottoms against a stop washer, not shown, at the end of chamber 63 at which time port plug 69 is replaced. The opposite chamber, 64 in this instance, is now filled with the fluid to be injected into the microbiological specimen in chamber 12. It is important that all entrapped air in the transfer chamber and passages 78 and 35 be removed and after having done this plug 70 is replaced, sealing chamber 64. Valves 25 and 26 in end cap 15 are now opened, and handle 73 is rotated in the transfer block to move piston 62 from left to right, forcing the inert sterile fluid into chamber 12 via passages 78 and 35 and transferring a volume of specimen fluid equal to that of the inert sterile fluid from chamber 12 to chamber 63 via passages 34 and 77. Valves 25 and 26 are now closed to isolate the chamber pressure from the transfer block and plugs 69 and 70 are slowly removed from the transfer block to gain access to the biological specimen in chamber 63.

If desired, the entire specimen in chamber 12 may be removed at one time by reducing the pressure in chamber 13 by cracking valve 37 and, at the reduced pressure, removing the specimen through either or both passages in end cap 15 and transfer block 61. Internal mixing of a sample is accomplished by rotating encapsulated stirring rod 51 by a conventional laboratory magnetic stirring device, not shown, which is set on the upper surface of end cap 15. The magnetic field generated by the device rotates the encapsulated magnetic stirring rod, assuring complete mixing of the fluids within culture chamber 12 as well as those fluids injected through transfer block 61. It will be appreciated that organisms can be damaged when samples containing them are reduced to atmospheric presssure.

There is thus provided a microbiological retrieval apparatus which provides scientists and others with a means for and method of soft-sampling deep water microbial specimens in their environment. Through use of the snubbing fluid and the adjustable orifice in passage 42, deep water sampling is obtained at as slow a rate of flow into chamber 12 as is desired. This slow rate of flow protects the bacteria from the sudden pressure changes and/or shock waves that are normally associated with opening an empty specimen flask at great ocean depths and pressures. The present invention allows long term study of microbial activity under the precise temperature and pressure conditions of the origin of the samples without suffering any decompression and subsequent recompression as are required with present sampling techniques. The specimen transfer block provides the researcher with a means for enlarging his study and knowledge of the microorganisms by removing or injecting fluids, nutrients, or chemicals into the in situ samples without changing the pressure in their new surroundings.

What is claimed is:

1. A microbiological specimen sampler for acquiring samples of deep ocean water under ambient conditions comprising:
   initially pressurized dual chamber means for receiving a water sample under ambient pressure at a controlled rate of flow in one of the dual chambers;
   said controlled flow accomplished by further pressurizing a partially pressurized gaseous medium in the other of the dual chambers and a snubbing fluid exposed to said pressurized gaseous medium in said one of said chambers;
   means at one end of said one chamber for admitting said ambient water thereinto and for accomodating recovery of the sample received in said sampler;
   sample recovery means adapted for connection to said means at one end of said apparatus in sealing relationship therewith;
   said recovery means including a chamber and passages communicating with said chamber and with passages to the sample in said apparatus;
   aa slidable piston in said chamber dividing said chamber into separate cavities; and
   means for providing selective access to said cavities, whereby one of said cavities and the passages connected thereto may be filled with a selected inert fluid and thereafter closed and the other cavity may then be filled with a portion of said sample, said portion recoverable from said other cavity by closing the passage connecting said one cavity and said sample and opening the access means for said other cavity.

2. A microbiological specimen sampler for receiving under sterile conditions microorganisms such as bacteria, fungi and yeast from great ocean depths in undamaged form comprising:
   a dual chambered apparatus having divisible chambers of equal volume and a passage interconnecting the two chambers;
   said chambers each divisible by a sealed, slidable member disposed in the same relative position therein;
   a snubbing fluid contained in one of said chambers and a correspondingly disposed pressurized gaseous medium contained in the other of said chambers;
   means for admitting water under ambient conditions into one end of said chamber containing snubbing fluid;
   the pressure of said water being exerted on said snubbing fluid via the adjacent one of said slidable members and on said gaseous medium via said passage and the other of said slidable members;
   means in said passage for controlling the rate of flow of snubbing fluid therethrough; and
   means for sealing said apparatus when flow through said passage ceases,
   said dual apparatus provided with end blocks for admitting ambient water at one end and pressurized gas at the other end,
   said chambers separated by a ported block containing said passage; and
   a fill port and a fill plug in said block providing access to the chamber containing snubbing fluid to facilitate charging said chamber with snubbing fluid,
   said end block admitting ambient water containing passages which terminate in the outer surface thereof and means controlling the opening of said passages to effect removal of an acquired sample;
   a pressure balanced sample recovery means adapted for connection to said end block for admitting ambient water,
   said sample recovery means including a chamber divided by a slidable member and passages communicating between respective remote ends of said chamber and the opposite exterior surfaces of said sample recovery means,
   said passages terminating in one exterior surface positioned to register with the passages terminating in the outer surface of said end block for admitting ambient water and the passages terminating in the opposite exterior surface having closure means removably inserted therein; and
   means for sealing the juncture of said passages when said sample recovery means and said end block are connected together,
   whereby a specimen sample is obtained at a slow rate of flow which avoids shock waves and other sources of possible damage to microorganisms in the acquired sample and portions of the specimen sample in said sampler may be removed by filling one end of the chamber in said sample recovery means and the passages communicating therewith with an inert fluid, expelling excess inert fluid by operation of said slidable member, sealing said passages communicating with said one end, filling the other end of the chamber in said sample recovery means with an inert fluid or other fluid to be injected into said sampler, sealing said passages communicating with said other end, selectively opening said means controlling the opening of said passages, and transferring said slidable member to the opposite end of its chamber thereby moving inert fluid into said sampler and a specimen of said sample into the chamber of said sample recovery means.

3. A microbiological specimen sampler for recovering deep ocean water samples without significant damage to the microorganisms therein comprising:

a deep sea pressure vessel containing a pair of chambers and means interconnecting said chambers;

means in each of said chambers for selectively dividing the respective chambers into mutually sealed areas of reciprocal volume;

means for pressurizing one of said chambers with gas in the area remote from said interconnecting means;

means for charging the other of said chambers with fluid in the area adjacent to said interconnecting means;

means for selectively controlling the opening in said interconnecting means;

means closing the end of the other of said chambers and means in said closing means for admitting ambient water thereinto;

a pair of passages in said closing means communicating with the environment and means for controlling the opening of said passages;

a fluid in the other of said chambers forcing the dividing means therein against said closing means;

a pressurized gas in said one of said chambers forcing the dividing means therein into contact with said interconnecting means so that a specimen of ambient water may be obtained at great depths by admitting ambient water into said other of said chambers thereby forcing the liquid therein through said passage connecting said chambers so as to further compress the gas in said one chamber and thereafter closing said means for admitting ambient water, said rate of flow of ambient water into said other of said chambers controlled by controlling the rate of flow of said fluid through said means interconnecting said chambers thereby admitting said ambient water at a rate of flow sufficiently low as to avoid damage to microorganisms in said ambient water;

the volume of said one of said chambers and the pressure of the gas pressurized therein being such that said pressurized gas prevents the dividing means therein from seating when said other of said chambers is fully occupied by its dividing means and ambient water.

4. The specimen sampler of claim 3 and further including a pressure balanced sample recovery means adapted for connection to said closing means, said sample recovery means including a cylindrical cavity and means in said cavity for selectively dividing it into mutually sealed areas of reciprocal volume;

a first pair of passages communicating between respective remote ends of said cavity and one exterior surface of said recovery means, said passages positioned so as to register with said pair of passages in said closing means communicating with the environment;

a second pair of passages communicating between the respective remote ends of said cavity and the opposite exterior surface of said sample recovery means; and means for sealing the juncture of said first pair of passages and said passages in said closing means when said sample recovery means and said pressure vessel are connected together, whereby a sample of the specimen in said sampler may be removed by connecting said recovery means to said closing means, filling one end of said cavity and the passages connected therewith with an inert fluid, moving said dividing means to that end of the cavity so as to expell excess inert fluid therein, sealing these passages and repeating the procedure with the passages connected with the other end of said cavity so that with both ends of said cavity charged with inert fluid, said means for controlling the opening of the passages in said closing means may be opened and said dividing means in said cavity moved to the opposite end of said chamber thereby injecting inert fluid into said sampler from one side of said dividing means in said cavity and drawing a sample of ambient water from said sampler to the opposite side thereof.

5. The specimen sampler of claim 4 wherein a cushion of fluid is initially provided between said closing means and the dividing means in the other of said chambers by introducing a fluid therebetween through said pair of passages in said closing means communicating with the environment, excess fluid being expelled when said other of said chambers is charged with fluid.

* * * * *